United States Patent
McGuire et al.

(10) Patent No.: US 7,305,663 B1
(45) Date of Patent: Dec. 4, 2007

(54) SYSTEM AND METHOD FOR STATE-BASED PROFILING OF MULTIPROCESSOR SYSTEMS

(75) Inventors: Marlin L. McGuire, Austin, TX (US); David Thanairongroj, Austin, TX (US); Paul Devriendt, Austin, TX (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 567 days.

(21) Appl. No.: 10/323,987

(22) Filed: Dec. 18, 2002

(51) Int. Cl.
*G06F 9/44* (2006.01)

(52) U.S. Cl. ............. 717/130; 717/124; 717/127; 717/128; 717/131

(58) Field of Classification Search ........ 717/154–158, 717/124–135; 712/200–244
See application file for complete search history.

(56) References Cited

U.S. PATENT DOCUMENTS

| | | | | |
|---|---|---|---|---|
| 5,778,059 A | * | 7/1998 | Loghmani et al. | 379/243 |
| 6,047,390 A | * | 4/2000 | Butt et al. | 714/43 |
| 6,092,180 A | * | 7/2000 | Anderson et al. | 712/200 |
| 6,654,948 B1 | * | 11/2003 | Konuru et al. | 717/127 |
| 6,954,923 B1 | * | 10/2005 | Yates, Jr. et al. | 717/130 |

OTHER PUBLICATIONS

Z. Aral et al., "Parasight: A High-Level Debugger/Profiler Architecture for Shared-Memory Multiprocessors", 1998, ACM.*

* cited by examiner

*Primary Examiner*—William H. Wood
(74) *Attorney, Agent, or Firm*—Zagorin O'Brien Graham LLP (57) ABSTRACT

The present application describes a system and method of profiling a computer system based on a profiling state machine. The profiling state machine defines various states in which the system data can be collected for a particular application. The state machine allows system data collection regardless of timing intervals or event counters. When a state is identified for system data collection, the profiler application collects system data for the user. A profiling application driver monitors the state machine and manages the data collection based on the state machine. The profiling application driver controls the profiling configurations thus allowing a correlated data collection for timing intervals and event counter.

33 Claims, 3 Drawing Sheets

SYSTEM AND METHOD FOR STATE-BASED PROFILING OF MULTIPROCESSOR SYSTEMS

BACKGROUND

1. Field of the Invention

The present application relates to computer system profiling and more specifically to profiling application codes executed in the computer system.

2. Description of the Related Art

Generally, system profiling applications on a computer system allow users to collect data regarding various elements of the computer system at different execution stages of an application code. Typically, users collect system data to determine the performance of the application code. The system data can include states of different components (e.g., various registers, internal states of processors, selected memory locations, various controllers and the like) at various data collection points in the application code. The data collection is typically driven by timer or performance/event counters. The user can specify a timing interval and/or identify a number of selected events for which the profiling application can collect system data.

When specified timing interval or number of identified events occur, interrupts are generated and the interrupt service routines collect system data. The interrupts are generated based on the timing interval and/or event counters. After the data is collected, the user can correlate the data collected based on the timing intervals with the data collected based on the event counters. In a multiprocessing system, where many processors run independently, it is difficult to determine the exact timing interval when a specified number of events may occur. Thus, to profile a computer system, the user has to ran many cycles of data collection to be able to correlate data collected based on timing intervals with the data collected based on event counters. A system and method is needed to efficiently profile a computer system.

SUMMARY

The present application describes a system and method of profiling a computer system based on a profiling state machine. The profiling state machine defines various states in which the system data can be collected for a particular application. The state machine allows system data collection regardless of timing intervals or event counters. When a state is identified for system data collection, the profiler application collects system data for the user. A profiling application driver monitors the state machine and manages the data collection based on the state machine. The profiling application driver controls the profiling configurations thus allowing a correlated data collection for timing intervals and event counters.

In some embodiments, the present invention describes a state machine in connection with computer system profiling. The state machine includes a set of state variables representing one or more profiling behaviors of one or more profiling applications; and a set of profiling objects, wherein each one of the profiling objects representing one or more profiling events causing a transition in association of the one or more profiling application from a first state variable to a second state variable. In some variations, the profiling object represents configuration of at least one profiling session for the profiling application.

In some embodiments, the profiling objects represent at least one of a predetermined profiling application event, a timing event and an input from a user. In some variations, the predetermined profiling application event includes execution of one or more elements of the profiling application for a predetermined number. In some variations, the timing event includes a predetermined execution timing interval of one or more elements of the profiling application. In some embodiments, the state machine is embodied in a software driver in the computer system.

In some embodiments, the present invention describes a method in connection with profiling on a computer system. In some variations, the method includes configuring one or more profiling objects for at least one profiling application, wherein the profiling application associating with at least one state variable representing a behavior of the profiling application in a profiling state machine. In some variations, the profiling objects cause a transition in the association of the profiling application from a first state variable to a second state variable. In some embodiments, the configuring the profiling objects represents configuration of at least one profiling session for the profiling application.

In some variations, the profiling objects represent at least one of a predetermined profiling application event, a timing event and an input from a user. In some variations, the predetermined profiling application event includes execution of one or more elements of the profiling application for a predetermined number. In some variations, the timing event includes a predetermined execution timing interval of one or more elements of the profiling application. In some embodiments, the method includes collecting data representing a profile of the computer system incident with a first event represented by the profiling object. In some variations, the method includes pausing the collection of data incident with a second event represented by the profiling object; and resuming the collection of data incident with a third event represented by the profiling object. In some variations, the method includes stopping the collection of data incident with a fourth event represented by the profiling object. In some variations, the method includes storing the collected data.

The foregoing is a summary and thus contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
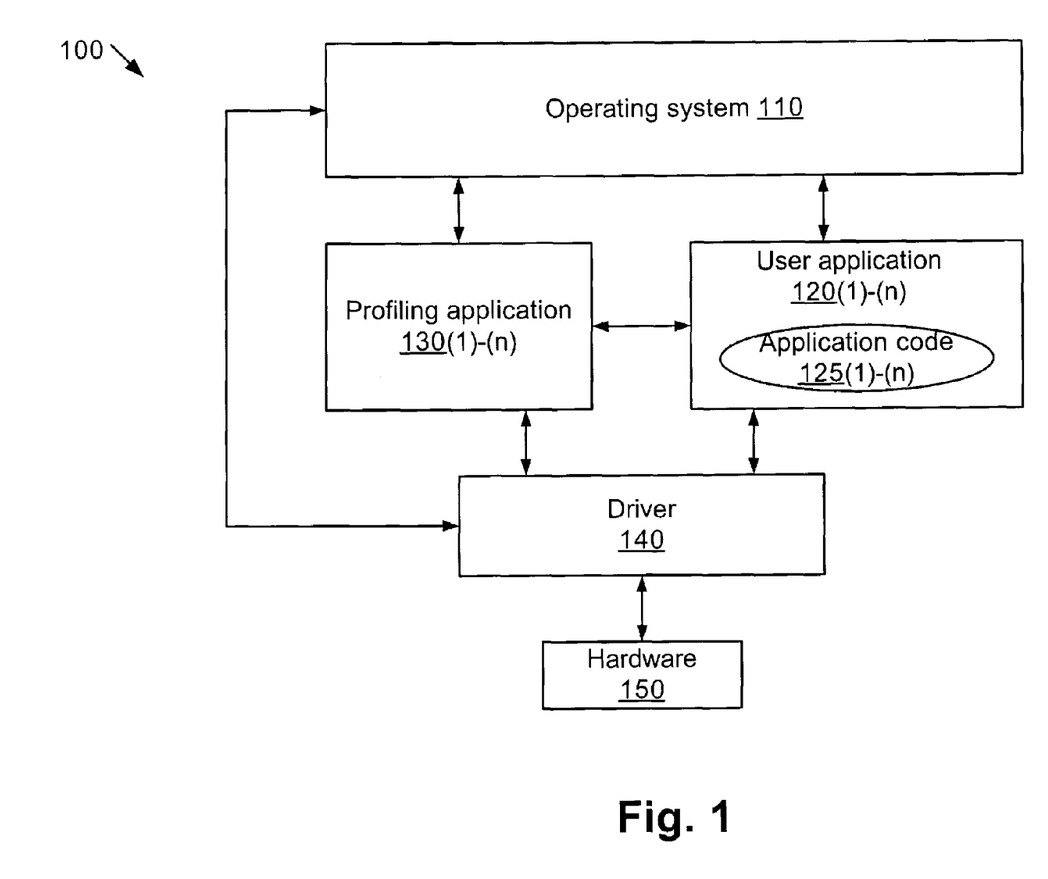
FIG. 1 illustrates an example of software module interaction according to an embodiment of the present invention.

FIG. 1 illustrates an example of software module interaction in a computer system 100 according to an embodiment of the present invention. One skilled in the art will appreciate that boundaries between the functionality of the above described operations are merely illustrative. The functionality of multiple modules may be combined into a single operation, and/or the functionality of a single module may be distributed in additional operations. Moreover, alternative embodiments may include multiple instances of a particular module, and the order of modules may be altered in various other embodiments.

The software environment of computer system 100 includes an operating system 110. Operating system 110 can facilitate the execution of multiple user applications 120(1)-(n). When user applications are initiated, the corresponding application codes 125(1)-(n) are executed. A user can run profiling applications 130(1)-(n) to profile computer system 100 during the execution of corresponding application code. The profiling applications 130(1)-(n) collect data, at specified instances of application code execution, about system elements (e.g., status of the hardware and software or the like) during the execution of the application code. The system data can help a user determine the code execution efficiency of the corresponding application.

Generally, the access to system elements (e.g., hardware registers, software pointers or the like) is secured to protect system integrity so the user applications do not directly access the protected elements of the system. Typically, the software applications execute calls to a system driver, driver 140, to access system hardware 150. When a user initiates an application, for example application 120(1), the corresponding application code, for example application code 125(1) is executed. The user can execute a profiling application, for example profiling application 130(1), to collect system data while application code 125(1) is executing.

The user can execute application code 125(1) on various processors in a multiprocessing system to determine the performance of application code 125(1). The user can also execute various portions of application code 125(1) on various different processors in the system. However, to collect system data, the user can configure a profiling application, for example profiling application 130(1) to collect system data during various stages of the execution of application code 125(1). Traditionally, profiling application 130(1) can collect system data based on timing, (e.g., at predetermined timing intervals or the like) or event based (e.g., at every predetermined number of predefined events or the like) and execute calls to driver 140 to program data collection.

When multiple profiling applications execute in a system then multiple data collection criteria can be configured and driver 140 can collect data for each profiling application according to the configured criteria. However, traditionally, the timing and event based data is collected independently which requires correlation for analysis purposes. According to an embodiment of the present invention, driver 140 collects system data based on a profiling state machine. The profiling state machine allows a user to configure the profiling of the system during application code execution using timing and event based triggering for data collection. The profiling state machine facilitates correlated system profiling to determine the efficiency of the application code.

Figure 2:
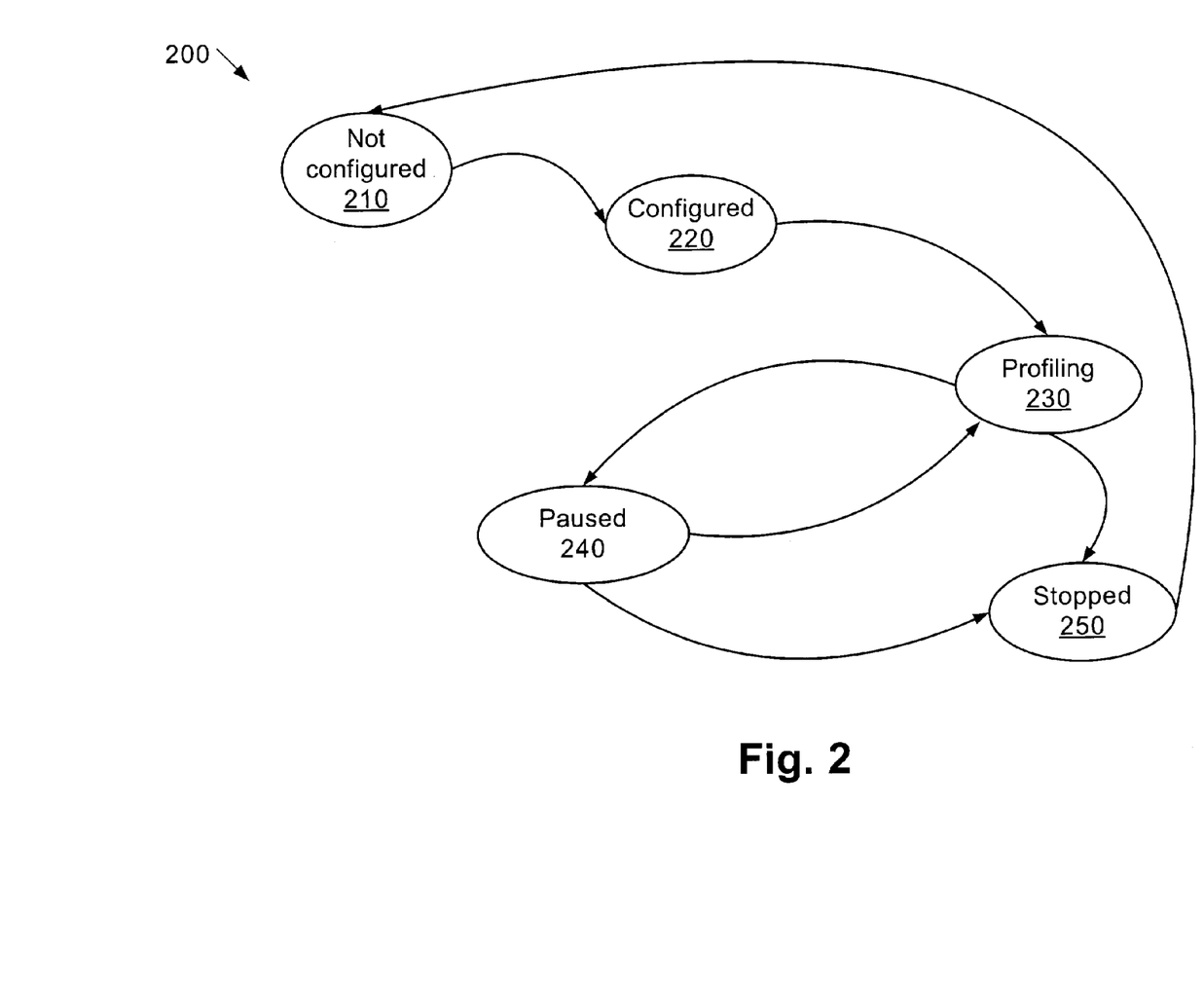
FIG. 2 illustrates an example of a profiling state machine according to an embodiment of the present invention.

FIG. 2 illustrates an example of a profiling state machine 200 according to an embodiment of the present invention.

While for purposes of illustration, specific entry and exit links are shown and described, one skilled in the art will appreciate that profiling state machine 200 can be configured to provide application specific entry and exit conditions for each state. Further, the number and description of states can be adapted to a particular profiling application. The state machine defined in the present example is implemented using driver routines (e.g., driver 140 or the like) in the computer system however the state machine can be implemented at any level of the software (e.g., operating system, applications or the like).

The computer system begins in a state of 'not configured' (210). In 'not configured' state, the driver (e.g., driver 140 or the like) can block any profiling attempt by a profiling application. Traditionally, a user application can set profiling event (e.g., setting a timer interval, event counter or the like) to start collecting profiling data at any time regardless of the state of the computer system. For example, in a multiprocessor computer system, one or more processors may not be ready to collect data because of the state of the processor such as, reconfiguration (e.g., re-boot, re-initialize or the like), resource constraints mode (e.g., not enough processing capability, storage, or the like) and the like. Attempting to collect profiling data under these circumstances can severely affect the performance of the computer system.

Thus initializing the system environment in a 'not configured' state not only requires a user application to configure the profiling session but also allows the computer system to be prepared for the profiling configuration. The user application can initialize the system for profiling by configuring the profiling parameters (e.g., events, timer intervals, type of data to be collected, devices to monitor or the like) for more than one processor. For example, the user application can execute different portions of a program on different processors. The state machine can allow profiling data collection for various different processors thus enabling the user application to determine the information regarding the code execution on different processors.

When a user application (e.g., user application 120 or the like) configures the system for profiling, the profiling state machine transitions from 'not configured' state to 'configured' state (220). A user application can be any application configured to be executed on the computer system (e.g., word processing, games, video or the like). The profiling configuration can be determined according to the system and software architecture. For example, some of the transitioning conditions (objects) can be for the user application to provide the name of a disk file to store the profiled data, identify specific events and/or timing intervals to initiate profiling when in profiling state, timer resolution, or the like. When a user application configures the profiling parameters, then the profiling state can transition from 'not configured' to 'configured'.

When the profiling state machine is executed by a system driver (e.g., driver 140 or the like) then the driver can verify the profiling configuration parameters before beginning the profiling. One skilled in the art will appreciate that the profiling conditions (objects that cause state transition) can be implementation specific. For example, a particular system requirement can be to program certain predetermined parameters (e.g., data file name, devices to monitor, type/amount of data to collect or the like) before a profiling can begin. However, after programming the required parameters, additional optional application specific parameters can also be configured (e.g., data block size in the memory, data file size, specific memory locations for data storage or the like).

The profiling configuration can be programmed using profiling parameters provided by the user. One skilled in the art will appreciate that the configuration information can be provided using various programming methods (e.g., manual data input, program driven configuration, application instrumentation, or combination thereof or the like). When appropriate configuration information is inputted in the profiling application (e.g., using manual programming, pre-programmed software scripts or combination thereof or the like), the configuration information can be used by driver routines to initialize system parameters (e.g., set timers, counters or the like). The 'not configured' state of the computer system requires a user application to follow predetermined configuration sequences (e.g., configuring required profiling parameters or the like) required to profile the system. When the profiling state machine transitions to 'configured' state, the system can be ready for profiling.

In the present example, the system exits from 'configured' state by transitioning to the state of 'profiling' (230). The state transition can occur when one or more profiling criteria (objects) are established. For example, when one or more profiling criteria are met (e.g., number of predetermined events occur, predetermined timing interval or the like) an interrupt can be generated and the associated interrupt service routine can start collecting system data. The data to be collected by the interrupt service routine can be predetermined during the configuration state. A user can identify specific information to collect about the application code that is being executed. For example the interrupted code segments of the application code, interrupted instruction pointers, process and thread identifications, time stamp counter value at interrupt, the processor that got interrupted, the source of the interrupt (e.g., timer, event or the like) and the like or combination thereof.

The type of data collected can depend upon specific profiling requirement of the application code. For example, when a user application desires to identify the resources used during the execution of a specific portion or element of an application code (e.g., code writing data to memory, code opening/closing internet sessions, coded transferring data to network, code managing internet requests or the like) then the user application can identify the states of all the system resources during the execution of that specific portion of the application code. Further, by profiling the system using profiling state machine 200, the profiling data can be collected based on timing intervals and the number of predetermined events (e.g., cache misses, data access or the like). As long as the system stays in the state of 'profiling' the required data can be collected according to the profiling configuration.

The data collected can be stored in local storage (e.g., associated memory or the like) or can be transferred to peripheral storage (e.g., magnetic/optical storage, transferred to remote location or the like). The memory management and storage schemes of the computer system can determine the processing (e.g., transfer from one storage to another or the like) of the profiling data.

The profiling can be executed in the background while the user application executes on the system. The profiling information can be used to determine the processor(s) spending most of its time executing the user application code. One skilled in the art will appreciate that the profiling can be done without any user application. In such case, the operating system can be profiled.

In the present example, the state of 'profiling' has two exit points, one to transition to a state of 'paused' (240) or a transition to a state of 'stopped' (250). The user application (e.g., user application 120) can pause the data collection by transitioning to the 'paused' state. In the 'paused' state, the system maintains configuration information for profiling as initially configured by the user application. The data file for the collected data remains open and the profiling data is maintained in the appropriate storage. The transition from the 'paused' state can be either to the state of 'profiling' to resume data collection or to the state of 'stopped' (250).

During the application code development, the target application code can be configured (e.g., using application programming interfaces or the like) by the developer of that application to assist profiling the function of the application. For example, a developer of a web server application may configure that application to "resume" the profiling when a web request is received across the network, and "pause" the profiling when the processing of that request is completed. In this manner, a profile taken over a period of time will only show the data of relevance to that application and will not contain profile data of large parts of system inactivity not related to the web server application.

The transition to 'paused' state and return can be determined initially during the configuration or can be dynamically enforced upon predetermined events. For example, a user can manually enforce 'paused' state by executing a system command, pressing a predefined key or the like. Similarly, the profiling application can execute commands to force the driver (e.g., driver 140 or the like) to enter into 'paused' state and perform predetermined actions (e.g., display certain data, transfer data, update profiling parameters or combination thereof or the like). When the user application forces the driver (e.g., driver 140 or the like) to transition to the state of 'profiling' from the 'paused' state, the data collection can begin immediately or upon next profiling event (e.g., timing interval, event counter or the like) according to the profiling configuration.

When the profiling state 200 machine transitions to 'stopped' state, the collection of profiling data stops and open files for collected data are closed and the profiling session end. The system returns to 'not configured' state so the user application can configure the profiling system for the next profiling session. One skilled in the art will appreciate that while for purposes of illustration, particular transitions from one state to another are shown, the state machine can be configured to transition to any state as required by the application. For example, the state machine can return to 'configured' state from the 'stopped' state to use the same configuration as the previous session. Similarly, for fault tolerance purpose, each state can be configured to return to the 'configured' or 'not configured' state to allow flexibility of profiling.

The states can be tracked using any state machine implementation known in the art. In some embodiments of the present invention, each state shown in FIG. 2 is implemented by a driver routine. The states are assigned a unique value, in a state variable, represented by different bit position settings for each state. The state variable defined in the driver stores the current state of the profiler. Before transitioning to another state, the current state is checked to determine whether the new state is valid and allowable. If validated, the transition occurs and the state variable is updated to reflect the new state. For example, if an application attempts to initiate profiling by requesting the driver to start profiling without configuring/initializing the driver then the driver will terminate the request for profiling because the appropriate state was not set (e.g., respective bits were not set in the state variable or the like).

Various triggering conditions can be defined for profiling. For purposes of illustrations, in the present example, two profiler types, event-based profile (EBP) and timer-based profile (TBP) are used. To differentiate these two types, a bit position can be defined in the state variable for each profile type. Following is an example of bit positions defined for each state and profile type according to an embodiment of the present invention:

define STATE_CONFIGURED_EBP 0x0010 define STATE_CONFIGURED_TBP 0x0020 define STATE_PROFILING_EBP 0x1000 define STATE_PROFILING_TBP 0x2000 define STATE_PAUSED_EBP 0x4000 define STATE_PAUSED_TBP 0x8000

Each state is defined using the particular type of profiling (e.g., event or timer based or the like). The state machine can be configured using the exemplary representation of each state. Following is an example of pseudo code for state machine implementation according to an embodiment of the present invention. One skilled in the art will appreciate the exemplary implementation of the state machine using exemplary state definitions is for illustrative purpose only and that the state machines can be implemented based on application specific requirements and variable definitions.

```
SetEventProperties
If (ProfilerState !=STATE_PROFILING_EBP) // if pro-
    filing is not currently active
{
    1) set event properties for each processor
    2) set STATE_CONFIGURED_EBP
}
else
{
    status = INVALID_EVENT_STATE
}
StartProfiler
// If the current state is not CONFIGURED or PAUSED,
    exit with error
If((ProfilerState == STATE_CONFIGURED_EBP) ||
    (ProfilerState == STATE_PAUSED_EBP))
{
    1) call StartEventProfiler
    2) set STATE_PROFILING_EBP
}
else
{
    return status = INVALID_START_STATE
}
StopProfiler
// If the current state is not PROFILING or PAUSED, exit
    with error
If((ProfilerState == STATE_PROFILING_EBP) ||
    (ProfilerState == STATE_PAUSED_EBP))
{
    1) call StopEventProfiler
    2) clear STATE_PROFILING_EBP & STATE_P-
       AUSED_EBP
}
else
{
    return status = INVALID_START_STATE
}
```

Figure 3:
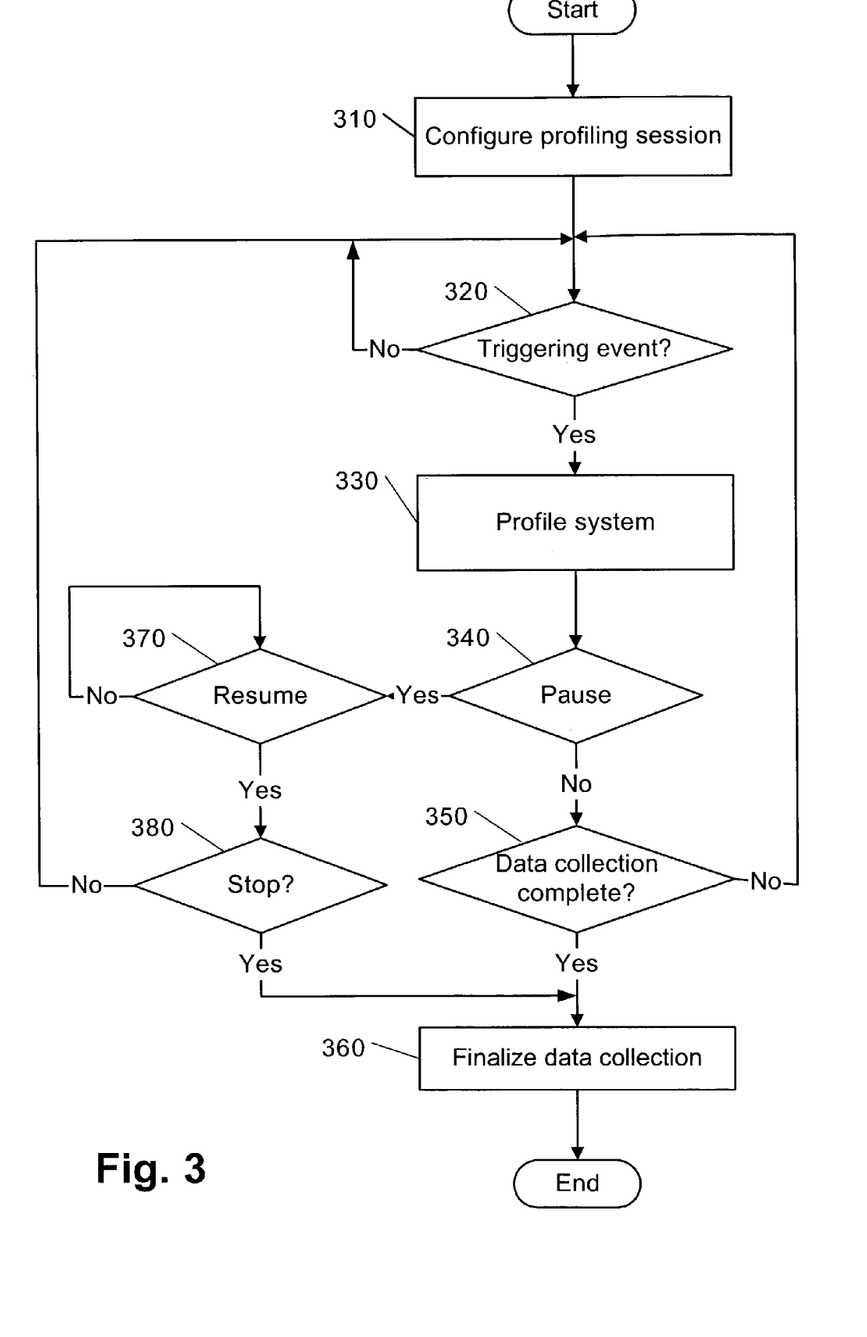
FIG. 3 is a flow diagram illustrating an exemplary sequence of operations performed during a process of executing profiling state machine according to an embodiment of the present invention.

FIG. 3 is a flow diagram illustrating an exemplary sequence of operations performed during a process of executing profiling state machine according to an embodiment of the present invention. While the operations are described in a particular order, the operations described herein can be performed in other sequential orders (or in parallel) as long as dependencies between operations allow. In general, a particular sequence of operations is a matter of design choice and a variety of sequences can be appreciated by persons of skill in the art based on the description herein.

Initially, the system environment begins in a 'not configured' state and the user configures the profiling session (310). As stated herein, the profiling session can be configured using various programming methods for example, a user can manually configure the profiling parameters, a software script can provide pre-programmed configuration parameters, or the information can be provided by application instrumentation, or combination thereof or the like. The profiling sessions can be initiated by executing appropriate profiling driver routines to program profiling parameters.

When the profiling environment in the system is configured, the profiling state transitions to 'configured' and begins monitoring appropriate profiling parameters. The profiling drivers determine whether a triggering event has occurred (320). The triggering event can be an occurrence of any configured event. For example, the configuration can require the profiling application to collect predetermined data based on timing intervals (e.g., the execution of a specified portion of the application code every 10 milliseconds or the like) or certain event counts (e.g., every tenth cache miss or the like). One skilled in the art will appreciate that the profiling parameters can be set based on the analysis of the application code that is being executed and profiled. If the triggering event does not occur, the profiling application continues to monitor the configured profiling parameters to determine the triggering.

When a triggering event occurs, the state machine transitions to 'profiling' state and system profiling data collection begins (330). As stated herein, the profiling data collection can be paused for various reasons (e.g., to prevent cluttering the profile data with uninteresting records at a time when the system is not performing any activity of interest, typically under control of the user application or the like). The profiling application monitors the pausing events (340). If a pausing event does not occur, the profiling application determines whether the data collection has completed based on the predetermined criteria (350). If the data collection has not completed, the profiling application continues to collect data (320). One skilled in the art will appreciate that the determination of the completion of data collection can be made as configured by the user. For example, the profiling application can be configured to collect certain amount of data during the 'profiling' state and stop collecting data even when the triggering events are still valid. In such case, when the required amount of data is not collected, the profiling application continues to collect the data instead of proceeding to monitor the next triggering event.

If the data collection has completed, the profiling state machine transitions to 'stopped' state and finalizes the data collection (360). The finalizing of the data collection can include various profiling related close-up events. For example, the profiling application can transfer collected data from temporary storage to identified storage devices, closing any open files, releasing resources or the like.

While for purposes of illustration, in the present example a 'pause' event is described (340), one skilled in the art will appreciate that the profiling application does not need to determine the pausing event during the data collection. The pausing event can be a manual event (e.g., pressing of a key or the like) which may not require a continuous monitoring. The determination of pausing event does not need to be a separate event from profiling. For example, the pausing event can be any interrupt (e.g., manual, software driven, execution of a break point in the code or the like) during the profiling or any predetermined event in the profiling application (e.g., collection of a predetermined amount of data, expiration of internal timers or the like). In such cases, the pause step can be interrupt driven and may not require monitoring as described herein.

When a pausing event occurs (e.g., user manually pauses the data collection, a predetermined event triggers pausing or the like) the profiling state machine transitions to 'paused' state and determines whether to transition out of the 'paused' state (370). The exit from the 'paused' state can be determined during the configuration. For example, if the profiling application is paused using a manual event (e.g., pressing a key or the like) then the transition can occur upon an occurrence of certain pre-determined events (e.g., pressing another key, expiration of a predetermined timer or the like). The profiling state machine 200 stays in the 'paused' state until the predetermined transitional event occurs.

One skilled in the art will appreciate that the application code for profiling can be configured to allow user intervention for analysis purpose. For example, an application can be configured to pause/resume profiling around interesting pieces of the application code (e.g., codes executing predetermined routines, recently modified code or the like). The user can manually stop the profiling and the resume/pause calls can fail due to the manual intervention. Alternatively, the user application (e.g., user application 120 or the like) can be configured to include the configuration calls within the application itself (e.g., to configure the resolution of the timer or to control the performance-counter registers or the like).

According to an embodiment of the present invention, in the present example, the transition out of the 'paused' state can be to either a 'stopped' state or to 'profiling' state. One skilled in the art will appreciate that the state transitions can be determined according to the profiling application and the profiling state machine can be configured to enter and exit out of various states as the profiling application requires. When a transitional event occurs in the 'paused' state, it is determined whether the transition to 'stopped' state is required (380).

The transition from 'paused' state to 'stopped' state can be determined based on various profiling application requirements. For example, if the profiling application is programmed to display collected data during the 'paused' state then after reviewing the data, a user can determine to stop the profiling application. Similarly, if the profiling application is programmed to analyze certain parameters during the 'paused' state then based on the programmed algorithm the profiling application can determine to continue or stop profiling. One skilled in the art will appreciate that various profiling related events can determine the transition from the 'paused' state.

If the transition to 'stopped' state is not required, the profiling application continues to the 'profiling' state and monitors for a next triggering event (320). While for purposes of illustration, a transition to triggering event (320) is described, the profiling application can be either configured to wait for the next triggering event or resume data collection from the pausing event (330). If the transition to 'stopped' state is required, the profiling state machine transitions to 'stopped' state and finalizes the data collection (360). The finalizing of the data collection can include various profiling related close-up events. For example, the profiling application can transfer collected data from temporary storage to identified storage devices, closing any open files, releasing resources or the like.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description.

The above described method, the operations thereof and modules therefore may be executed on a computer system configured to execute the operations of the method and/or may be executed from computer-readable media. Computer systems may be found in many forms including but not limited to mainframes, minicomputers, servers, workstations, personal computers, notepads, personal digital assistants, various wireless devices and embedded systems, just to name a few. A typical computer system includes at least one processing unit, associated memory and a number of input/output (I/O) devices. A computer system processes information according to a program and produces resultant output information via I/O devices. A program is a list of instructions such as a particular application program and/or an operating system.

A computer program is typically stored internally on computer readable storage media or transmitted to the computer system via a computer readable transmission medium. A computer process typically includes an executing (running) program or portion of a program, current program values and state information, and the resources used by the operating system to manage the execution of the process. A parent computer process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The method described above may be embodied in a computer-readable medium for configuring a computer system to execute the method. The computer readable media may be permanently, removably or remotely coupled to system 100 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

While particular embodiments of the present invention have been shown and described, it will be clear to those skilled in the art that, based upon the teachings herein, various modifications, alternative constructions, and equivalents may be used without departing from the invention claimed herein. Consequently, the appended claims encompass within their scope all such changes, modifications, etc. as are within the spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. A multiprocessor computer system, comprising:
  a state machine configured to facilitate profiling of individual ones of a plurality of processors of the multiprocessor computer system, the state machine comprising:
    a set of state variables representing a plurality of profiling behaviors of corresponding ones of a plurality of profiling applications; and
    a set of state transitioning parameters, wherein each one of the state transitioning parameters represents one or more events for causing a transition of a respective one of the plurality of profiling applications from a first state variable to a second state variable;
  wherein individual ones of the plurality of profiling applications are configured to separately profile execution of one or more application portions executing separately on respective ones of the plurality of processors of the multiprocessor system;
  wherein individual ones of the set of state transitioning parameters represent at least one of a predetermined profiling application event, a timing event and an input from a user;
  wherein the predetermined profiling application event includes execution of one or more elements of a corresponding one of the plurality of profiling applications a predetermined number of times.

2. The system of claim 1, wherein the plurality of profiling applications includes one or more of a user application and a system profiling data collection application.

3. The system of claim 1, wherein one of the set of state transitioning parameters includes a session configuration of at least one profiling session for at least one of the plurality of profiling applications.

4. The system of claim 1, wherein the timing event includes a predetermined interval of execution time of one or more elements of a corresponding one of the plurality of profiling applications.

5. The system of claim 1, wherein the timing event includes expiration of a predetermined timer.

6. The system of claim 1, wherein the state machine is embodied in a software driver in the multiprocessor computer system.

7. The system of claim 1, wherein the state machine configures at least one of the plurality of profiling applications to collect data from the system based, at least in part, on a plurality of triggering events, the plurality of triggering events including at least one event based, at least in part, on a timing interval and at least one event based, at least in part, on an event counter and the data being correlated to the plurality of triggering events.

8. The system of claim 1, wherein the one or more application portions is one application portion executing separately on individual ones of the plurality of processors of the multiprocessor system.

9. A method in connection with profiling on a computer system, comprising:
  configuring a plurality of state transition parameters for corresponding ones of a plurality of profiling applications, wherein each of the plurality of profiling applications is associated with at least one state variable representing a behavior of the profiling application in a profiling state machine;
  wherein individual ones of the plurality of profiling applications are configured to separately profile execution of one or more application portions executing separately on respective ones of a plurality of processors of the computer system;
  wherein the state transition parameters represent at least one of a predetermined profiling application event, a timing event and an input from a user;
  wherein the predetermined profiling application event includes one or more of a software and a hardware interrupt.

10. The method of claim 9, further comprising:
  causing a transition in the association of at least one of the plurality of profiling applications from a first state variable to a second state variable responsive to at least one corresponding state transition parameter.

11. The method of claim 9, wherein at least one of the plurality of profiling applications includes one or more of a user application and a system profiling data collection application.

12. The method of claim 9, wherein the configuring the plurality of state transition parameters includes session configuration of at least one profiling session for a corresponding one of the plurality of profiling applications.

13. The method of claim 9, wherein the timing event includes a predetermined interval of execution time of one or more elements of a corresponding one of the plurality of profiling applications.

14. The method of claim 9, wherein the timing event includes expiration of a predetermined timer.

15. The method of claim 9, further comprising:
  collecting data representing a profile of the computer system incident with a first state transition parameter.

16. The method of claim 15, further comprising:
  pausing the collection of data incident with a second state transition parameter; and
  resuming the collection of data incident with a third state transition parameter.

17. The method of claim 16, further comprising:
  stopping the collection of data incident with a fourth state transition parameter.

18. The method of claim 17, further comprising:
  storing the collected data.

19. The method of claim 9, further comprising:
configuring at least one of the plurality of profiling applications to collect data from the system based, at least in part, on a plurality of triggering events, the plurality of triggering events including at least one event based, at least in part, on a timing interval and at least one event based, at least in part, on an event counter and the data being correlated to the plurality of triggering events.

20. The method of claim 9, wherein the one or more application portions is one application portion executing separately on individual ones of the plurality of processors of the computer system.

21. A computer program product, stored on at least one computer readable medium and comprising a set of instructions, the set of instructions being configured to:
configure a plurality of state transition parameters for corresponding ones of a plurality of profiling applications, wherein individual ones of the plurality of profiling applications are associated with at least one state variable representing a behavior of a corresponding one of the plurality of profiling applications in a profiling state machine,
wherein individual ones of the plurality of profiling applications are configured to separately profile execution of one or more application portions executing separately on respective ones of a plurality of processors of a multiprocessor system;
wherein the state transition parameters represent at least one of a predetermined profiling application event, a timing event and an input from a user;
wherein the predetermined profiling application event includes execution of one or more elements of a corresponding one of the plurality of profiling applications for a predetermined number of times.

22. The computer program product of claim 21, wherein at least one of the state transition parameters causes a transition in the association of a corresponding one of the plurality of profiling applications from a first state variable to a second state variable.

23. The computer program product of claim 21, wherein at least one of the plurality of profiling applications includes one or more of a user application and a system profiling data collection application.

24. The computer program product of claim 21, wherein the plurality of state transition parameters includes a session configuration of at least one profiling session for a corresponding one of the plurality of profiling applications.

25. The computer program product of claim 21, wherein the timing event includes a predetermined interval of execution time of one or more elements of a corresponding one of the plurality of profiling applications.

26. The computer program product of claim 21, wherein the timing event includes expiration of a predetermined timer.

27. The computer program product of claim 21, wherein the timing event includes a predetermined interval of execution time of one or more elements of a corresponding one of the plurality of profiling applications.

28. The computer program product of claim 21, wherein the set of instructions are further configured to:
collect data representing a profile of the computer system incident with a first state transition parameter.

29. The computer program product of claim 21, wherein the set of instructions is further configured to configure at least one of the plurality of profiling applications to collect data from a multiprocessor system based, at least in part, on a plurality of triggering events, the plurality of triggering events including at least one event based, at least in part, on a timing interval and at least one event based, at least in part, on an event counter and the data being correlated to the plurality of triggering events.

30. The computer program product of claim 21, wherein the one or more application portions is one application portion executing separately on individual ones of the plurality of processors of the multiprocessor system.

31. A computer program product, stored on at least one computer readable medium and comprising a set of instructions, the set of instructions being configured to:
configure a plurality of state transition parameters for corresponding ones of a plurality of profiling applications, wherein individual ones of the plurality of profiling applications are associated with at least one state variable representing a behavior of a corresponding one of the plurality of profiling applications in a profiling state machine,
wherein individual ones of the plurality of profiling applications are configured to separately profile execution of one or more application portions executing separately on respective ones of a plurality of processors of a multiprocessor system;
wherein the set of instructions are further configured to:
collect data representing a profile of the computer system incident with a first state transition parameter;
pause the collection of data incident with a second state transition parameter; and
resume the collection of data incident with a third state transition parameter.

32. The computer program product of claim 31, wherein the set of instructions are further configured to:
stop the collection of data incident with a fourth state transition parameter.

33. The computer program product of claim 32, wherein the set of instructions are further configured to:
store the collected data.

* * * * *